Dec. 9, 1969 C. A. NANNEY 3,483,487

STRESS MODULATION OF ELECTROMAGNETIC RADIATION IN SEMICONDUCTORS, WITH WIDE RANGE OF FREQUENCY TUNING

Filed Dec. 29, 1966

INVENTOR
C. A. NANNEY
BY David P. Kelley
ATTORNEY

United States Patent Office 3,483,487
Patented Dec. 9, 1969

3,483,487

STRESS MODULATION OF ELECTROMAGNETIC RADIATION IN SEMICONDUCTORS, WITH WIDE RANGE OF FREQUENCY TUNING

Cecil A. Nanney, Murray Hill, N.J., assignor to Bell Telephone Laboratories, Incorporated, Murray Hill and Berkeley Heights, N.J., a corporation of New York Filed Dec. 29, 1966, Ser. No. 605,876
Int. Cl. H01s 3/18
U.S. Cl. 332—7.51 8 Claims

ABSTRACT OF THE DISCLOSURE

In order to have a device which can radiate coherent electromagnetic energy of a frequency within a controllably wide spectral range, a controllable stress is applied to a semiconductor, such as gray tin, which has the property of a very narrow band gap under zero stress and a rapidly increasing band gap under increasing stress. Such a semiconductor can also be arranged for use as an F.M. or A.M. modulator of electromagnetic radiation.

This inventon relates to solid state devices for the generation of frequencies in the high microwave and infrared regions of the electromagnetic wave spectrum, and for the modulation of waves at such frequencies.

The range of frequencies that can be generated has been greatly expanded in recent years with the advent of various optical frequency generators. This expansion has left, however, a gap in the spectrum, in the high microwave and far infrared regions, that has not been completely satisfactorily filled by present day high frequency oscillators.

The device of the present invention is capable of frequency generation in the high microwave and far infrared regions of the spectrum. It is based upon the discovery that gray tin, which is a particular phase of tin achieved by precipitation from a mercury solution, for example, at low temperatures, has an energy gap that varies directly with pressure. In contrast to most direct gap materials, gray tin, which is a direct gap material, undergoes an increase of energy gap with an increase in pressure, the gap being approximately zero at zero pressure. In a p-n junction device of gray tin, this phenomenon makes it possible to produce a tunable coherent output frequency covering an approximate range of from 20 gigacycles to 10 microns, with substantially less pressures than required for those materials whose gap varies inversely with pressure.

In a first illustrative embodiment of the invention, a gray tin p-n junction diode has applied in a direction normal to the plane of the junction a compressive stress by any suitable means. A D-C voltage source is used to bias the diode in the forward direction. Under these conditions, a coherent electromagnetic wave output from the junction occurs, the frequency of which is controlled by the amount of stress applied. As a typical example, for an applied forward bias of from 1 to 5 volts and a compression of $10^4$ pounds per square inch, the output of the junction is a high frequency wave of 100 microns wavelength. A decrease in the stress has the effect of decreasing the output frequency, and an increase in stress increases the output frequency.

A frequency modulated output is readily obtainable from such a junction device. A modulating signal is converted into a varying stress by means of a suitable transducer, thereby producing an output frequency of which varies in accordance with the modulating signal.

In direct gap materials, when the inherent frequency of the energy gap is greater than the frequency of electromagnetic radiation incident on the material, the material transmits the incident energy substantially unattenuated. On the other hand, as the gap decreases, the amount of energy transmitted decreases, due to an increase in absorption of the material as the energy represented by the energy becomes less than the incident energy. This phenomenon is utilized in a second illustrative embodiment of the invention to produce amplitude modulation of a wave incident upon the material. A slab or block of gray tin has applied thereto by any suitable means a compressive stress sufficient to produce an energy gap in the region of the frequency of the incident wave. By means of a suitable transducer a stress that varies in accordance with the modulating signal is also applied to the material to produce in the material an energy gap characteristic that varies with the modulating information. As a consequence, a wave incident upon the material from any suitable source is amplitude modulated in passing through the material, as explained in the foregoing.

In another illustrative embodiment of the invention a block of gray tin is bombarded by an electron beam of from 10 to 30 kilovolts, and a compressive stress is applied to the block to vary the energy gap. The electron bombardment excites carriers across the energy gap, that is, it excites them to a higher energy level. These electrons then recombine with carriers of opposite sign, giving up their energy in the form of recombination radiation. The frequency of radiation is determined by gap width, which is in turn determined by the amount of stress applied. The bombarding electrons possess sufficient energy to excite carriers across the gap, whatever the width of the gap may be.

It is a feature of the present invention that a direct gap material such as gray tins, has applied thereto a compressive stress which produces an energy gap in the material directly proportional to the applied stress.

It is another feature of the invention in an embodiment thereof, that the gap width is varied directly by an applied compressive stress which varies in accordance with an applied signal.

The various principles and features of the present invention will be more readily apparent from the following detailed description, read in conjunction with the drawings, in which.

Figure 1:
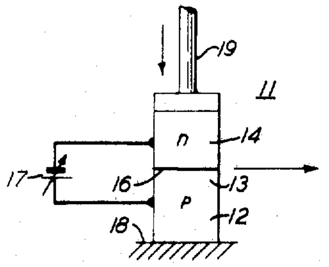
FIG. 1 is a diagrammatic view of an illustrative embodiment of the invention as a high frequency generator.

In FIG. 1 there is shown a light generator 11 comprising a gray tin ($Sn_G$) device 12 having a p region 13 and an n region 14 forming a junction 16. A typical n-type dopant for $Sn_G$ is antimony while a typical p-type dopant is indium. Other suitable dopants may, of course, be used. The device is forward biased by a suitable source 17 of, for example, one to five volts. The device 12 is mounted on a suitable mount or base 18 and has applied thereto, by suitable means such as a piston 19, a compressive stress.

As explained heretofore, the energy gap $E_G$ of the material varies directly with applied compressive stress. The device of FIG. 1 will oscillate when the voltage from source 17 is sufficient, in this case from one to five volts, to excite electrons or carriers across the gap from the valence band to the conduction band. These carriers then give up their energy in dropping back to the valance band in the form of recombination radiation at a frequency $f_{OUT}$ given by $$f_{OUT}=E_G/h \quad (1)$$

where $h$ is Planck's constant and $E_G$ is the energy gap in electron volts. Variation of the compressive stress applied by the means 19 produces, as explained heretofore, a corresponding variation in the energy gap, hence, from Equation 1, an output frequency variation. For a compression of approximately $10^4$ pounds per square inch, the wavelength of the output frequency is approximately 100 microns.

Figure 2:
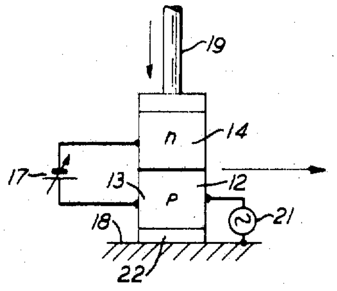
FIG. 2 is a diagrammatic view of an embodiment of the invention as a frequency modulator.

From Equation 1 it can be seen that the output frequency of the device of FIG. 1 can be varied in accordance with a modulating signal. Such a frequency modulation arrangement is shown in FIG. 2 where, for simplicity, the reference numerals of FIG. 1 have been used to designate the same elements. The arrangement of FIG. 2 differs from that of FIG. 1 in the inclusion of a source 21 of modulating signals, and a suitable transducer 22, such as a cadmium sulfide or quartz crystal, for converting the electrical signals from source 21 into pressure variations upon the element 12. The transducer is connected between member 13 and the conducting base 18 upon which transducer 22 rests. The basic output frequency is determined, as with the arrangement of FIG. 1, by the pressure exerted by the member 19. Frequency variations are introduced by the pressure variations of element 22, the net result being an output that is frequency modulated in accordance with the signals from source 21, which may, of course, take any of a number of forms.

Figure 3:
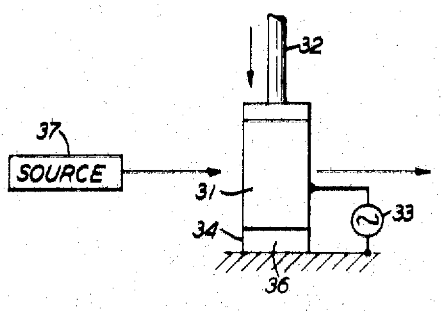
FIG. 3 is a diagrammatic view of an embodiment of the invention as an amplitude modulator.

The principles of the present invention are also applicable to amplitude modulation of waves within the frequency range of operation of gray tin. In FIG. 3 there is depicted an amplitude modulator which operates in accordance with these principles.

The arrangement of FIG. 3 comprises a block 31 of $Sn_G$ to one end of which is applied a compressive stress by any suitable means, depicted as a piston 32. A source of signals 33 is connected to block 31 through a suitable transducer 34 which converts the signals to mechanical vibrations, i.e., stresses. A suitable support 36 is provided for the assembly.

In operation, electromagnetic waves to be modulated are directed from a source 37 into the block 31. It is a characteristic of direct gap materials, for example, that where the photon energy of the incident wave is less than the energy gap $E_G$, the material is substantially transparent to the incident energy. On the other hand, where the energy gap is less than the incident energy, the waves are attenuated in an amount proportional to the energy difference. In the arrangement of FIG. 3, the compression of member 32 is such that the energy gap is slightly less than the incident energy, that is, the frequency of the gap is less than the frequency of the incident waves. The pressure variations of transducer 36 then vary the gap width to produce greater or lesser attenuation of the wave energy passing through the material, thereby amplitude modulating the waves.

Figure 4:
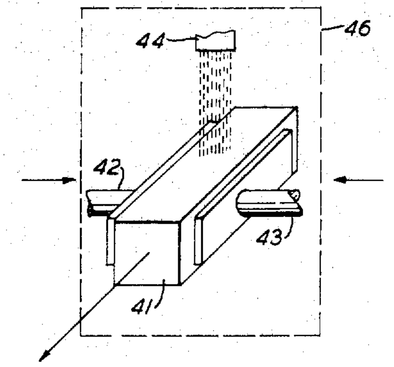
FIG. 4 is a perspective view of an embodiment of the invention as a high frequency generator.

In FIG. 4 there is shown an arrangement whereby coherent oscillations are achieved without a junction device. In the arrangement of FIG. 4, a block 41 of gray tin has applied thereto a compressive stress by suitable means such as pistons 42, 43, to vary the energy gap as explained in the foregoing. A beam of electrons is directed onto block 41 from a beam source 44. The assembly is enclosed in a container 46 which is evacuated.

The bombarding electrons in the beam excite carriers or electrons in the block 41 across the energy gap after which they relax back, giving up their energy in the form of coherent radiation at a frequency given by Equation 1. For electron beam energies of from 10 kilovolts to 30 kilovolts, a range of frequencies is possible at the output. The electron beam energy must be great enough to produce substantial penetration of the material, as would be obvious to workers skilled in the art.

The foregoing illustrative embodiments are intended to illustrate the principles of the invention. Numerous other embodiments utilizing these principles may occur to workers in the art without departure from the spirit and scope of the invention.

What is claimed is:

1. A solid state electromagnetic wave device comprising a member of material consisting essentially of gray tin, means for exciting carriers from the valence band to the conduction band of the material, and means for controlling the output frequency of said device comprising means for applying a compressive stress to the material.

2. A solid state device in accordance with claim 1 in which the means for applying the stress to the material include:

(a) first means for applying a constant stress to the material, and (b) second means for applying a stress to the material which varies in time according to a prescribed signal.

3. A solid state electromagnetic wave device as claimed in claim 1 wherein said member is a p-n junction device and the means for exciting the carriers comprises means for applying a forward bias across the junction.

4. A solid state electromagnetic wave device as claimed in claim 1 wherein the means for exciting the carriers comprises means for bombarding the member with electrons.

5. An electromagnetic wave generator comprising a p-n junction device of gray tin, means for applying a forward bias across the junction, and means for controlling the output frequency of said generator comprising means for applying a compressive stress to said device.

6. An electromagnetic wave generator as claimed in claim 5 and further including means for applying a compressive stress that varies in accordance with a modulating signal.

7. An electromagnetic wave modulator comprising a member of gray tin, means for directing electromagnetic waves to be modulated through said member, first means for controlling the degree of absorption of the waves in said member comprising means for applying a compressive stress to said member, and second means for varying the degree of absorption of the waves comprising means for applying a compressive stress to said member which varies in accordance with a modulating signal.

8. An electromagnetic wave generator comprising a member of gray tin, means for applying a compressive stress to said member to vary the energy gap thereof and hence the output frequency, and means for exciting electrons in said member across the energy gap comprising means for bombarding said member with electrons.

References Cited

UNITED STATES PATENTS 3,245,002 4/1966 Hall.
3,387,230 6/1968 Marinace.

OTHER REFERENCES

Dimmock et al.: "Band Structure and Laser Action in $Pb_xSn_{1-x}Te$," June 27, 1966, pp. 1193–1196, vol. 16, No. 26, Physical Review Letters.

ALFRED L. BRODY, Primary Examiner

U.S. Cl. X.R.

148—33; 307—308, 312; 317—235; 31—945; 332—16, 26, 52